(12) United States Patent
Park et al.

(10) Patent No.: US 11,383,384 B2
(45) Date of Patent: Jul. 12, 2022

(54) ROBOT AND METHOD FOR CONTROLLING ROBOT

(71) Applicant: LG ELECTRONICS INC., Seoul (KR)

(72) Inventors: Sung Gil Park, Seoul (KR); Changwoo Son, Seoul (KR); Seyul Son, Uiwang-si (KR); Taeyoung Choi, Seoul (KR); Seuk Woo Ryu, Ansan-si (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 16/833,158

(22) Filed: Mar. 27, 2020

(65) Prior Publication Data
US 2021/0154854 A1 May 27, 2021

(30) Foreign Application Priority Data

Nov. 25, 2019 (KR) ........................ 10-2019-0152736

(51) Int. Cl.
*B25J 9/16* (2006.01)
(52) U.S. Cl.
CPC ............ *B25J 9/1697* (2013.01); *B25J 9/1679* (2013.01)
(58) Field of Classification Search
CPC ........ B25J 9/109; B25J 9/1612; B25J 9/1679; B25J 9/1697
See application file for complete search history.

(56) References Cited

U.S. PATENT DOCUMENTS

| | | | | |
|---|---|---|---|---|
| 4,620,362 A | * | 11/1986 | Reynolds | B25J 15/04 483/9 |
| 7,008,362 B2 | * | 3/2006 | Fitzgibbon | B23Q 3/15546 483/12 |
| 7,706,918 B2 | * | 4/2010 | Sato | B25J 9/1612 700/245 |
| 8,260,458 B2 | * | 9/2012 | Kim | B25J 9/1612 700/245 |
| 9,687,982 B1 | * | 6/2017 | Jules | B25J 9/161 |
| 2011/0010009 A1 | * | 1/2011 | Saito | B25J 9/1612 700/253 |
| 2012/0059517 A1 | * | 3/2012 | Nomura | B25J 9/1679 700/259 |

(Continued)

FOREIGN PATENT DOCUMENTS

JP 4531832 B2 8/2010

*Primary Examiner* — Nicholas Kiswanto
(74) *Attorney, Agent, or Firm* — Birch, Stewart, Kolasch & Birch, LLP (57) ABSTRACT

Disclosed is a robot and a method for controlling a robot. The robot according to an embodiment of the present disclosure may include an end-effector configured to grip a tool, a tactile sensor disposed in the end-effector, the tactile sensor configured to generate tactile information about an identifier formed on the tool, and a processor configured to cause the end-effector to grip the tool, and determine at least one of a type or a posture of the tool gripped by the end-effector based on the tactile information received from the tactile sensor. Embodiments of the present disclosure may be implemented by executing an artificial intelligence algorithm and/or machine learning algorithm in a 5G environment connected for the Internet of Things.

20 Claims, 8 Drawing Sheets

(56) References Cited

U.S. PATENT DOCUMENTS

| | | | |
|---|---|---|---|
| 2015/0251314 A1* | 9/2015 | Nammoto | B25J 9/1687 |
| | | | 700/259 |
| 2016/0075521 A1* | 3/2016 | Puchwein | B65G 1/1378 |
| | | | 700/218 |
| 2016/0306340 A1* | 10/2016 | Nammoto | G05B 19/402 |
| 2020/0046439 A1* | 2/2020 | Tekiela | A61B 34/74 |
| 2020/0246980 A1* | 8/2020 | Kuppuswamy | G01L 5/0061 |
| 2021/0107165 A1* | 4/2021 | Yerazunis | G01L 1/04 |
| 2021/0270605 A1* | 9/2021 | Patel | G06T 7/50 |

\* cited by examiner

ROBOT AND METHOD FOR CONTROLLING ROBOT

CROSS-REFERENCE TO RELATED APPLICATION

Pursuant to 35 U.S.C. § 119(a), this application claims the benefit of an earlier filing date of and the right of priority to Korean Application No. 10-2019-0152736, entitled "Robot and method for controlling robot," filed in Korea on Nov. 25, 2019, the contents of which are incorporated by reference herein in their entirety.

BACKGROUND

1. Technical Field

The present disclosure relates to a robot. More particularly, the present disclosure relates to a robot capable of identifying a type and a posture of a gripped tool.

2. Description of Related Art

Recently, robots that may be conveniently used in daily life are being developed. Such robots are used to help people in their daily lives at home, school, and other public places.

Recently, cooking robots capable of cooking using a robot have been gradually increasing. For example, Japanese Patent Application Publication No. 4,531,832 discloses a robot including a hand part, an arm part for changing a position and a posture of the hand part, and a support part for supporting the arm part, the robot assisting in cooking by using a cooking vessel disposed on a cooking burner.

The cooking robot may use a cooking tool to cook food. When the cooking robot grips the cooking tool through an end-effector of a robot arm, it is required to identify whether the desired tool is gripped with a correct posture.

SUMMARY OF THE INVENTION

Embodiments of the present disclosure provide methods for identifying a type and a posture of a tool gripped by a robot.

Embodiments of the present disclosure provide methods for improving accuracy of an operation by correcting a posture of an end-effector based on the type and the posture of the tool gripped by the robot.

Aspects of the present disclosure is not limited to those mentioned above, and other aspects and advantages not mentioned above will be understood from the following description, and become more apparent from the exemplary embodiments. Moreover, aspects of the present disclosure may be realized by the means and combinations thereof indicated in claims.

A robot and a method for controlling the robot according to an embodiment of the present disclosure may be configured to determine at least one of a type or a posture of a tool gripped by an end-effector based on tactile information about an identifier received from a tactile sensor disposed in the end-effector.

A robot according to an aspect of the present disclosure may include an end-effector configured to grip a tool, a tactile sensor disposed in the end-effector to generate tactile information about an identifier formed on the tool, and a processor configured to cause the end-effector to grip the tool, and determine at least one of a type or a posture of the tool gripped by the end-effector based on the tactile information received from the tactile sensor.

The tactile information may include a three-dimensional tactile image.

The processor may convert the three-dimensional tactile image into a two-dimensional tactile image, and may determine the type or the posture of the tool based on a comparison between the converted two-dimensional tactile image and template tactile images of identifiers.

The converted two-dimensional tactile image may include a plurality of pixels or a group of pixels representing a value or a color corresponding to a spatial height of the three-dimensional tactile image.

The processor may determine the type of the tool based on a template tactile image that matches the two-dimensional tactile image.

The processor may determine a gripped posture of the tool based on a comparison between coordinates of feature points of the two-dimensional tactile image and the matching template tactile image.

The processor may correct a posture of the end-effector based on a comparison between the gripped posture of the tool and a reference posture.

The processor may rotate the end-effector to compensate for a difference between a normal gripping angle of the reference posture and a gripping angle of the tool.

The identifier may include imprinted information in which a pattern is characterizable by tactile sensation. The imprinted information may include at least one of braille, type, imprint, marker, or barcode of which at least a portion is protruding or recessed.

The robot according to an embodiment of the present disclosure may further include a memory configured to store position information of the tool. The processor may cause the end-effector to grip the tool based on the position information of the tool.

The robot according an embodiment of the present disclosure may further include an image sensor. The processor may identify the tool based on sensor data obtained from the image sensor, determine a gripping position of the identified tool, and cause the end-effector to grip the tool based on the determined gripping position.

A method for controlling a robot according to another aspect of the present disclosure may include gripping a tool with an end-effector, receiving tactile information about an identifier formed on the tool from a tactile sensor disposed in the end-effector, and determining at least one of a type or a posture of the tool gripped by the end-effector based on the received tactile information.

The method may further include correcting the determined tool posture based on analyzing the received tactile information using a learning model based on an artificial neural network (ANN).

According to an embodiment of the present disclosure, a program code may be stored in a computer readable storage medium, and when executed, the program code may cause at least one processor to perform the method for controlling a robot described above.

According to embodiments of the present disclosure, the robot can identify the type and posture of the tool gripped by the end-effector.

According to embodiments of the present disclosure, accuracy of an operation of the robot can be improved by correcting the posture of the end-effector based on the type and posture of the tool gripped by the end-effector.

Effects of the present disclosure are not limited to the above-mentioned effects, and other effects, not mentioned above, will be clearly understood by those skilled in the art from the description of claims.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

In what follows, embodiments disclosed in this document will be described in detail with reference to appended drawings, where the same or similar constituent elements are given the same reference number irrespective of their drawing symbols, and repeated descriptions thereof will be omitted. As used herein, the terms "module" and "unit" used to refer to components are used interchangeably in consideration of convenience of explanation, and thus, the terms per se should not be considered as having different meanings or functions. In addition, in describing an embodiment disclosed in the present document, if it is determined that a detailed description of a related art incorporated herein unnecessarily obscure the gist of the embodiment, the detailed description thereof will be omitted. Furthermore, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driver including a motor in order to perform various physical operations, such as moving joints of the robot. A movable robot may be provided with a wheel, a brake, a propeller, and the like so as to be capable of traveling on the ground or flying in the air. In addition, the robot may be provided with legs or feet so as to be capable of walking on two legs or four legs on the ground.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle may include a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

Figure 1:
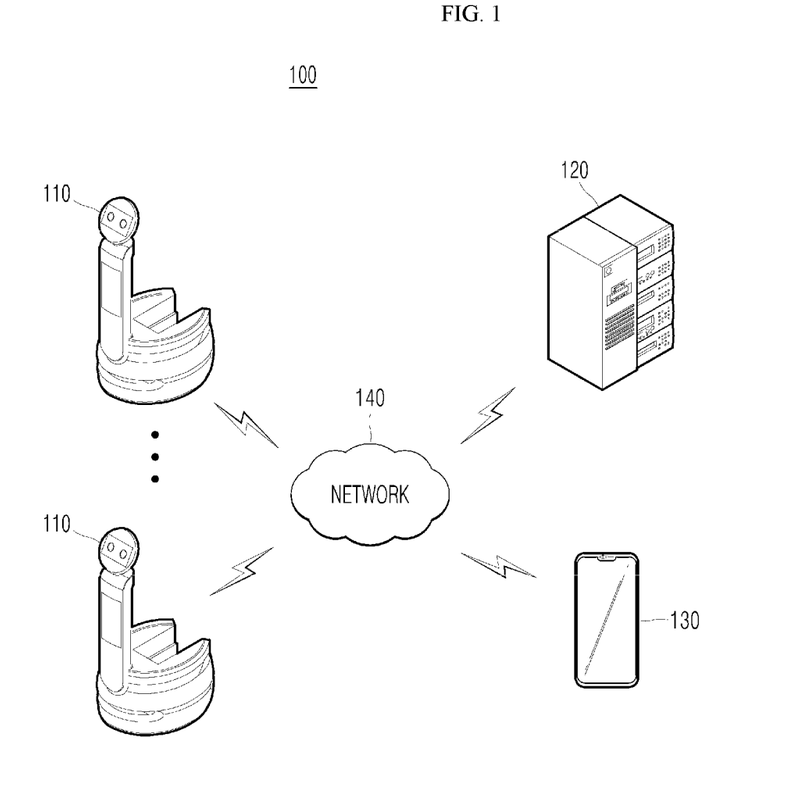
FIG. 1 is a diagram illustrating a robot system according to an embodiment of the present disclosure.

FIG. 1 is a diagram illustrating a robot system according to an embodiment of the present disclosure. Referring to FIG. 1, a robot system according to an embodiment of the present disclosure may include one or more robots 110 and a server 120, and may optionally further include a terminal 130.

The one or more robots 110, the server 120, and the terminal 130 may be connected to one another via a network 140. The one or more robots 110, the server 120, and the terminal 130 may communicate with one another via a base station, but may also communicate directly with one another without the base station.

The one or more robots 110 may perform an operation in a space, and may provide information or data related to the operation to the server 120. A workspace of the robot may be indoors or outdoors. The robot may operate in a space predefined by a wall, a pillar, or the like. In this case, the workspace of the robot may be defined in various ways depending on the design purpose, working attributes of the robot, mobility of the robot, and other factors. The robot may also operate in an open space, which is not predefined. The robot may also sense a surrounding environment and determine a workspace by its own accord.

The one or more robots 110 may provide their state information or data to the server 120. The state information of the robot 110 may include, for example, information about the robot 110 regarding a position, a battery level, durability of parts, and replacement cycles of consumables.

The server 120 may perform various analysis based on information or data provided by the one or more robots 110, and control overall operation of a robot system based on the analysis result. In one aspect, the server 120 may directly control driving of the robot 110 based on the analysis result. In another aspect, the server 120 may derive and output useful information or data from the analysis result. In still another aspect, the server 120 may adjust parameters in a robot system using the derived information or data. The server 120 may be implemented as a single server, but may be implemented as a plurality of server sets, a cloud server, or a combination thereof.

The terminal 130 may share the role of the server 120. In one aspect, the terminal 130 may obtain information or data from the one or more robots 110 and provide the information or data for the server 120, or may obtain information or data from the server 120 and provide the information or data for the one or more robots 110. In another aspect, the terminal 130 may share at least a portion of analysis to be performed by the server 120, and may provide a result of the analysis for the server 120. In still another aspect, the terminal 130 may receive an analysis result, information, or data from the server 120, and may simply output the analysis result, information, or data.

The terminal 130 may share the role of the server 120. At least one robot of the plurality of robots 110 may replace the server 120. In this case, the plurality of robots 110 may be connected to communicate with each other.

The terminal 130 may include various electronic devices capable of communicating with the robot 110 and the server 120. The terminal 130 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD), a set-top box (STB), a digital multimedia broadcast (DMB) receiver, a radio, a laundry machine, a refrigerator, a desktop computer, and digital signage.

The network 140 may refer to a network which constitutes a portion of a cloud computing infrastructure or which is provided in a cloud computing infrastructure. The network 140 may be, for example, a wired network such as local area networks (LAN), wide area networks (WAN), metropolitan area networks (MAN), or integrated service digital networks (ISDN), or a wireless communications network such as wireless LAN, code division multi access (CDMA), Wideband CDMA (WCDMA), long term evolution (LTE), long term evolution-advanced (LTE-A), 5-generation (5G) communications, Bluetooth™ or satellite communications, but is not limited thereto.

The network 140 may include connection of network elements such as hubs, bridges, routers, switches, and gateways. The network 140 may include one or more connected networks, for example, a multi-network environment, including a public network such as an Internet and a private network such as a safe corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

Figure 2:
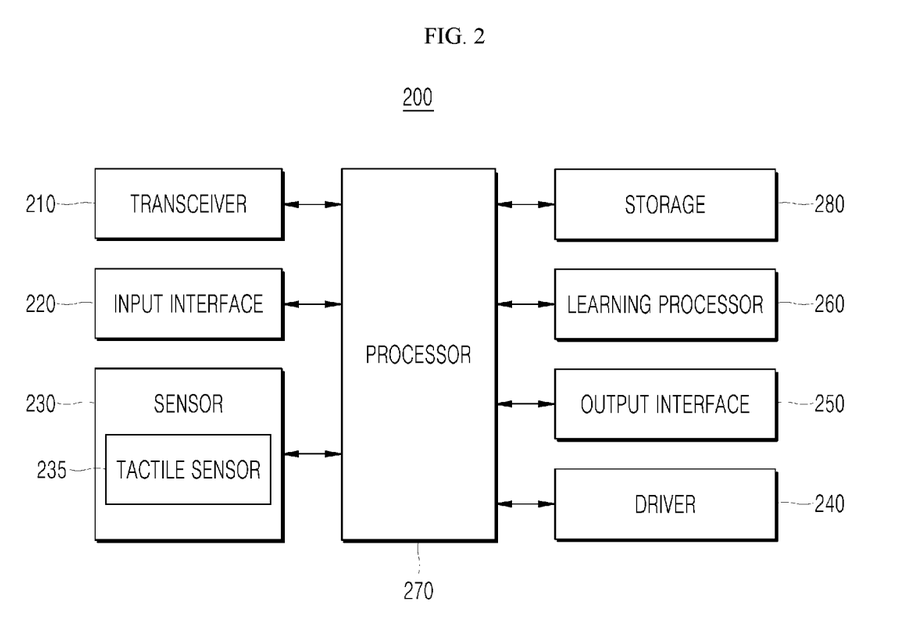
FIG. 2 is a block diagram illustrating a configuration of a robot according to an embodiment of the present disclosure.
Figure 3:
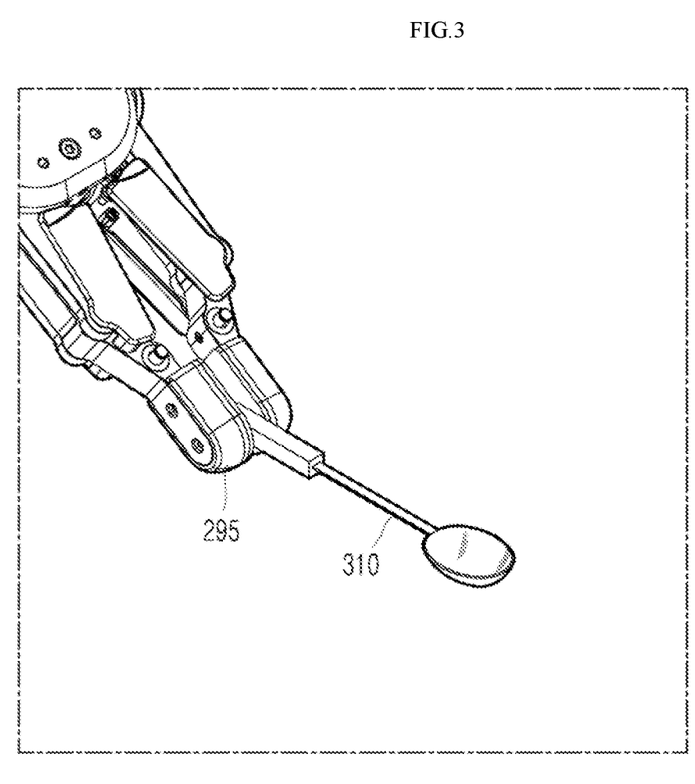
FIG. 3 is a diagram illustrating an end-effector of a robot according to an embodiment of the present disclosure.
Figure 4:
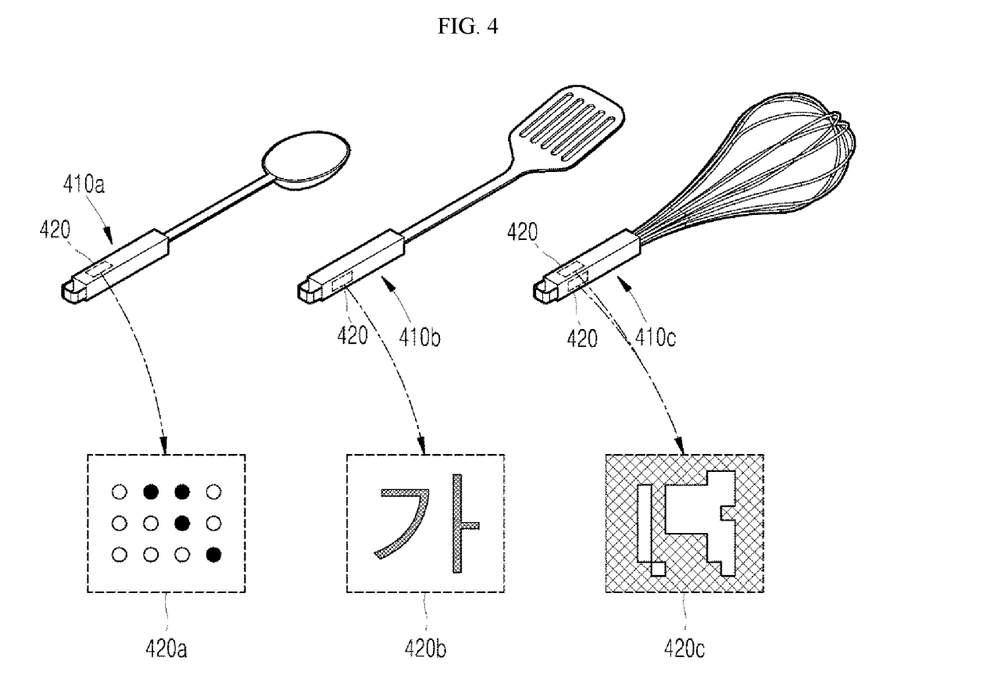
FIG. 4 is a diagram illustrating a cooking tool according to an embodiment of the present disclosure.

FIG. 2 is a block diagram illustrating a configuration of a robot according to an embodiment of the present disclosure. FIG. 3 is a diagram illustrating an end-effector of a robot according to an embodiment of the present disclosure. FIG. 4 is a diagram illustrating a cooking tool according to an embodiment of the present disclosure.

Referring to FIG. 2, a robot 200 according to an embodiment of the present disclosure may include a transceiver 210, an input interface 220, a sensor 230, a driver 240, an output interface 250, a storage 270, and a memory 280. The sensor 230 may include a tactile sensor 235. The robot 200 may further include a learning processor 260 to perform operations related to artificial intelligence (AI) and/or machine learning.

In an embodiment, the robot 200 may be configured to cook food using a cooking tool, a cooking device, or the like. The robot 200 may cook food according to a cooking command. The cooking command may be received from the server 120 or the terminal 130 through the transceiver 210, but may also be received through the input interface 220.

Referring to FIG. 3, the robot 200 may include at least one robot arm for cooking food and an end-effector 295 mounted on the robot arm. In an embodiment, the robot arm may include a plurality of subarms and at least one connector connecting the plurality of subarms to perform various cooking operations. The robot arm may be implemented in various structures and/or forms capable of three-dimensionally moving and rotating the end-effector 295. The end-effector 295 may be mounted at the end of the robot arm such that the robot 200 is able to perform an operation related to cooking, thereby performing various functions related to cooking. The end-effector 295 may be implemented as a robot hand or gripper for gripping a cooking tool 310.

Referring to FIG. 4, a turner 410a, a ladle 410b, and a whisk 410c are illustrated as cooking tools which may be gripped by the end-effector 295. However, the cooking tools are not limited thereto, and various tools for various purposes, such as a knife, a spatula, tongs, chopsticks, a spoon, a porter filter, a tamper, a hand mixer, and the like, may be gripped by the end-effector 295.

In an embodiment, an identifier 420 may be formed on the cooking tool. The identifier 420 may be formed on a surface of a grip of the cooking tool. The identifier 420 may be formed at a position on the grip of the cooking tool gripped by the end-effector 295. For example, as illustrated in FIG. 4, the identifier 420 may be formed on one or more surfaces of respective grips of the turner 410a, the ladle 410b, and the whisk 410c.

The identifier 420 may include imprinted information in which a pattern is characterizable by tactile sensation. The identifier 420 may include braille, type, imprint, marker, or barcode having a protruding portion or a recessed. For example, as illustrated in FIG. 4, the identifier 420 may include braille 420a, type 420b, and marker 420c having a protruding portion or a recessed portion. In an embodiment, in the braille 420a, the type 420b, and the marker 420c, a white portion may be continuous with the surface of the grip, and a hatched portion may represent a portion protruding therefrom. In another embodiment, the hatched portion of the braille 420a, the type 420b, and the marker 420c may be continuous with the surface of the grip, and the white portion may represent a portion recessed therefrom. In other words, the imprinted information of the identifier 420 may be formed by embossing or engraving.

The transceiver 210 may transmit and receive information or data with external devices such as the server 120, or the terminal 130 using wired or wireless communication technology. For example, the transceiver 210 may transmit or receive sensor data, a user input, a learning model, a control signal, and the like with the external devices. The transceiver 210 may include a transceiver for transmitting and receiving data, such as a receiver, a transmitter, or a transceiver.

The transceiver 210 may use communication technology such as global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), wireless LAN (WLAN), wireless-fidelity (Wi-Fi), Bluetooth™, radio frequency identification (RFID), infrared data association (IrDA), ZigBee, near field communication (NFC), visible light communication, and light-fidelity (Li-Fi).

The transceiver 210 may use a 5G communication network. The transceiver 210 may communicate with external devices such as the control server 120 and the terminal 130 by using at least one service of enhanced mobile broadband (eMBB), ultra-reliable and low latency communication (URLLC), or massive machine-type communication (mMTC).

eMBB is a mobile broadband service. eMBB may provide multimedia content, wireless data access, and the like. Further, eMBB may also provide enhanced mobile services such as a hot spot and a broadband coverage to cover the mobile traffic which is explosively increased. Through a hotspot, high-volume traffic may be accommodated in an area where user mobility is low and user density is high. Through broadband coverage, a wide-range and stable wireless environment and user mobility may be guaranteed.

The URLLC service may defines requirements that are far more stringent than existing LTE in terms of reliability and transmission delay of data transmission and reception, and corresponds to a 5G service for production process automation in the industrial field, telemedicine, remote surgery, transportation, safety, and the like.

The mMTC is a transmission delay-insensitive service that requires a relatively small amount of data transmission. mMTC enables a much larger number of terminals, such as sensors, than general mobile cellular phones to be simultaneously connected to a wireless access network.

In an embodiment, the transceiver 210 may receive a cooking command from the server 120 or the terminal 130. The cooking command may include a command to perform some or all of operations for cooking a particular food.

The input interface 220 may obtain various types of data. The input interface 220 may include, for example, at least one camera for obtaining an image signal including a still image or a video image, a microphone for obtaining an audio signal, and a user interface for receiving information from a user.

In an embodiment, the input interface 220 may receive the above-described cooking command through a user interface. That is, the cooking command may be provided through the input interface 220.

The input interface 220 may obtain input data to be used when obtaining an output utilizing training data and a training model for training an artificial neural network (ANN). The input interface 220 may obtain raw input data. In this case, the processor 270 or the learning processor 260 may extract an input feature by preprocessing the input data.

The sensor 230 may include a tactile sensor 235. The tactile sensor 235 may generate tactile information about an identifier formed on a cooking tool gripped by the end-effector 295. The identifier may include braille, type, imprint, or the like in which a pattern is characterizable by tactile sensation. The tactile sensor 235 may transmit the generated tactile information to the processor 270. The tactile information may include a three-dimensional tactile image representing a spatial distribution of pressure or force measured by the tactile sensor 235. The tactile sensor 235 may include various forms and/or types of sensors utilizing various tactile recognition technologies such as tactile imaging, electronic skin, and the like. The tactile sensor 235 may be disposed at one position on the end-effector 295 where the cooking tool is gripped.

The sensor 230 may include an image sensor. The image sensor may be used to identify a cooking tool to be gripped by the end-effector 295. In some embodiments, the image sensor may generate image information about an identifier formed on the cooking tool. In this case, the identifier may include a barcode or the like in which a pattern is visually characterizable. The image sensor may include various forms and/or types of image sensors known to those skilled in the art. The image sensor may be disposed at one position of the end-effector 295 or the robot arm that are capable of identifying the cooking tool or the identifier of the cooking tool.

The sensor 230 may obtain at least one of internal information of the robot 200, surrounding environment information of the robot 200, or user information by using various other sensors. The sensor 230 may include, for example, an acceleration sensor, a magnetic sensor, a gyro sensor, an inertial sensor, a proximity sensor, an illumination sensor, a humidity sensor, a fingerprint sensor, an ultrasonic sensor, a microphone, a lidar, a radar, and any combinations thereof.

Sensor data obtained by the sensor 230 may be at least partially used by the robot 200 to autonomously perform cooking according to a cooking command. In one aspect, the sensor data may be used for autonomous driving or autonomous walking of the robot 200. In another aspect, the sensor data may be used by the robot 200 to identify a cooking tool or a cooking device in the vicinity, and to determine a gripping position by the end-effector 295.

The driver 240 may physically drive the robot 200. The driver 240 may include an actuator or a motor operated according to a control signal from processor 270. The driver 240 may three-dimensionally move or rotate the robot arm and/or the end-effector 295 according to the control signal from the processor 270. In addition, the driver 240 may drive a wheel, a brake, and a propeller for driving of the robot 200, or robot legs and feet for walking of the robot 200 according to the control signal from the processor 270.

The output interface 250 may generate a visual, auditory, or tactile related output. The output interface 250 may include a display outputting visual information, a speaker outputting auditory information, and a haptic module outputting tactile information.

The storage 280 may store data supporting various functions of the robot 200. The storage 280 may store information or data received by the transceiver 210, and input information, input data, training data, a learning model, and a learning history, obtained by the input interface 220. The storage 280 may include, for example, a RAM memory, a flash memory, a ROM memory, an EPROM memory, an EEPROM memory, registers, or a hard disk.

The storage 280 may store cooking information about cooking operations which can be performed by the robot 200, and cooking tool information about cooking tools which can be used by the robot 200. The cooking information may include, for example, information about foods which can be cooked by the robot 200, detailed cooking operations for cooking each of the foods, and information about cooking tools used in the cooking operations. The cooking tool information may include, for example, template tactile images of identifiers corresponding to the cooking tools, information about current positions of the cooking tools, and reference postures of the cooking tools. Such template tactile images may be compared with tactile information and/or a tactile image obtained by the tactile sensor 235. The cooking information and the cooking tool information may be pre-collected from the server 120 or the terminal 130, and stored in the storage 280, and may be periodically updated.

The processor 270 may determine at least one executable operation of the robot 200, based on information determined or generated using a data analysis algorithm or a machine learning algorithm. In addition, the processor 270 may control components of the robot 200 to perform the determined operation.

The processor 270 may request, retrieve, receive, or use information or data of the learning processor 260 or the storage 280, and may control components of the robot 200 to execute a predicted operation or an operation determined to be preferable of the at least one executable operation. When connection with an external device such as the server 120 and the terminal 130 is necessary to perform the determined operation, the processor 270 may generate a control signal to control the corresponding external device, and may transmit the generated control signal to the corresponding external device.

The processor 270 may control at least some of components of the robot 200, to drive an application stored in the storage 280. Furthermore, the processor 270 may operate two or more components included in the robot 200 in combination with each other to drive the application.

The processor 270 may include, for example, one or more of a mobile processor, an application processor (AP), a microprocessor, a central processing unit (CPU), and a graphic processing unit (GPU), a neural processing unit (NPU), a processor core, a multiprocessor, an application-specific integrated circuit (ASIC), or a field programmable gate array (FPGA), but is not limited thereto.

Figure 5:
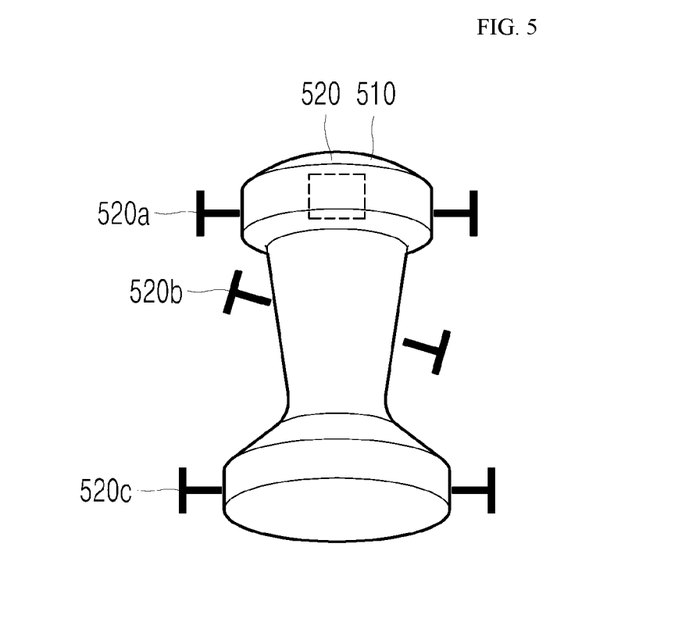
FIG. 5 is a diagram illustrating determination of a gripping position according to an embodiment of the present disclosure.
Figure 6A:
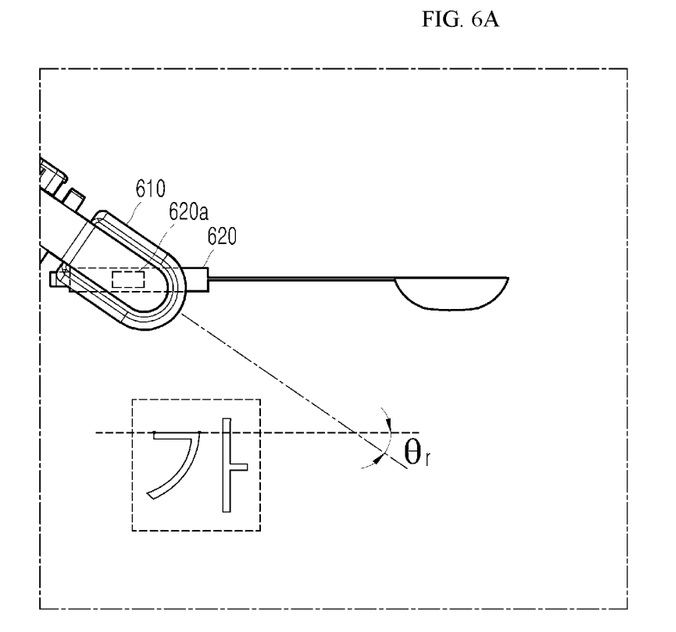
FIGS. 6A and 6B are diagrams illustrating correction of an end-effector posture according to an embodiment of the present disclosure.
Figure 6B:
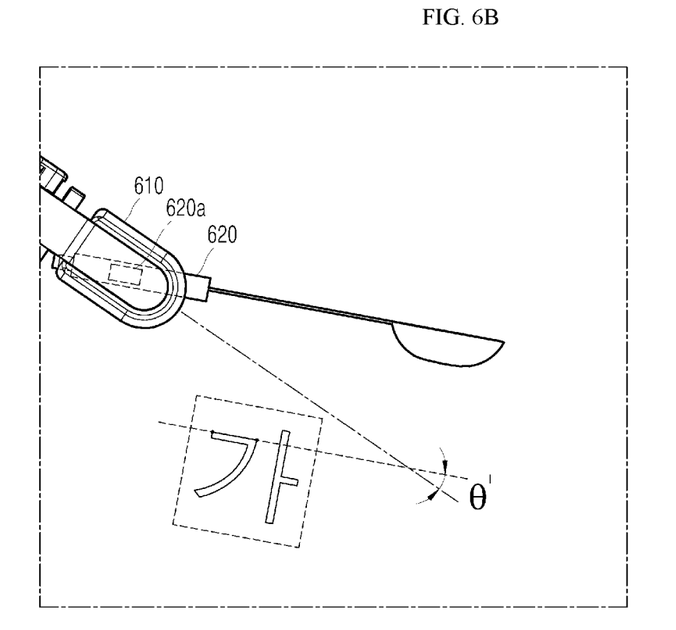

FIG. 5 is a diagram illustrating determination of a gripping position according to an embodiment of the present disclosure. FIG. 6 is a diagram illustrating correction of an end-effector posture according to an embodiment of the present disclosure. Hereinafter, an operation of the processor 270 will be described with reference to FIGS. 5 and 6.

The processor 270 may control the driver 240 to perform a cooking operation according to a cooking command received from the transceiver 210 or the input interface 220. When the use of a cooking tool is required during the cooking operation, the processor 270 may three-dimensionally move and rotate the robot arm and/or the end-effector 295 to grip the cooking tool.

In an embodiment, the processor 270 may move the robot arm and/or the end-effector 295 toward a cooking tool to be used with reference to current positions of cooking tools stored in the storage 280. Initial reference positions of the cooking tools in a cooking space may be predefined, and the processor 270 may continue to track positions of the cooking tools throughout the cooking operation. Accordingly, with reference to the cooking tool to be used, and more particularly to position coordinates of a grip of the cooking tool to be used, the processor 270 may cause the end-effector 295 to grip the cooking tool. In some embodiments, sensor data obtained from the image sensor may be used to assist in the identification and gripping of the cooking tool.

In another embodiment, the processor 270 may identify a cooking tool based on sensor data obtained from the image sensor, determine a gripping position of the identified cooking tool, and move the end-effector 295 to the determined gripping position. In FIG. 5, a tamper 510 is illustrated as an example of the cooking tool. When the tamper 510 is identified by the image sensor, the processor 270 may determine a gripping position of the identified tamper 510. In an embodiment, as illustrated in FIG. 5, the processor 270 may determine a position 520a in which an identifier 520 is formed among a plurality of candidate positions 520a, 520b, and 520c, as the gripping position.

When the cooking tool is gripped by the end-effector 295, tactile information about an identifier formed on the cooking tool may be generated by the tactile sensor 235 disposed in the end-effector 295. The processor 270 may determine at least one of a type or a gripped posture of the cooking tool based on the tactile information received from the tactile sensor 235.

In an embodiment, the tactile information may include a three-dimensional tactile image representing a spatial distribution of pressure or force measured by the tactile sensor 235. The processor 270 may convert the three-dimensional tactile image received from the tactile sensor 235 into a two-dimensional tactile image. Such conversion may be performed using a predefined conversion matrix. In an embodiment, the converted two-dimensional tactile image may include a plurality of pixels or a group of pixels representing a value or a color corresponding to a spatial height of the three-dimensional tactile image.

The processor 270 may compare the converted two-dimensional tactile image with template tactile images of identifiers pre-stored in the storage 280. The processor 270 may determine a type and/or a posture of the gripped cooking tool based on the comparison result.

The processor 270 may extract feature points or an outline from the converted two-dimensional tactile image, and may determine, based on the extracted feature points or outline, a matching template tactile image or a template tactile image having the highest similarity to the extracted feature points or outline. The processor 270 may determine the matching tactile image while appropriately rotating the converted two-dimensional tactile image or the template tactile images. The processor 270 may determine a cooking tool corresponding to the determined template tactile image as the cooking tool gripped by the end-effector 295.

The processor 270 may determine the gripped posture of the cooking tool based on a comparison between coordinates of the feature points of the converted two-dimensional tactile image and the matching template tactile image. The coordinates of the feature points may be two-dimensional coordinates on a specific plane, but may also be three-dimensional coordinates on a specific space. The gripped posture of the cooking tool may represent a gripping angle of the cooking tool relative to the end-effector 295. The gripping angle may include an angle at which the cooking tool is rotated in an up-down direction with respect to the end-effector 295, an angle at which the cooking tool is rotated in a left-right direction with respect to the end-effector 295, or a combination thereof.

The processor 270 may correct a posture of the end-effector 295 based on a comparison between the gripped posture of the cooking tool and a reference posture. FIG. 6A illustrates a reference posture of a cooking tool 620 relative to an end-effector 610, and FIG. 6B illustrates an example in which the cooking tool 620 is gripped by the end-effector 610. Correction of the posture of the end-effector 610 will be described with reference to FIGS. 6A and 6B.

The reference posture may represent a position of the cooking tool 620 relative to the end-effector 610 in a state where the cooking tool 620 is correctly gripped by the end-effector 610. In an embodiment, the reference posture may be represented as a normal gripping angle of the end-effector 610 and the cooking tool 620. The normal gripping angle may represent a particular angle at which the cooking tool 620 is rotated in the up-down direction with respect to the end-effector 610. When the cooking tool is rotated in the left-right direction with respect to the end-effector 295, the cooking tool may be considered not to be in a state of being correctly gripped.

Referring to FIG. 6A, the reference posture may be defined as a state in which the cooking tool 620 is rotated by a normal gripping angle θr in the up-down direction with respect to the end-effector 610. The normal gripping angle of the reference posture may be defined in various ways. For example, in a case in which the end-effector 610 grips the cooking tool 620 in a horizontal direction is defined as the reference posture, the normal gripping angle θr may be 0 degrees. In a case in which the end-effector 610 grips the cooking tool 620 in a vertical direction is defined as the reference posture, the normal gripping angle θr may be 90 degrees. The reference posture and the normal gripping angle θr may be set to be the same for all cooking tools, but may also be set differently for each cooking tool.

Referring to FIG. 6B, the processor 270 may determine a gripped posture of the cooking tool 620 by comparing the feature points or outline of the two-dimensional tactile image and the template tactile image for an identifier 620a of the cooking tool 620. Specifically, the processor 270 may determine a gripping angle θ' of the cooking tool 620 relative to the end-effector 610. The processor 270 may correct the posture of the end-effector 610 based on a comparison between the determined gripping angle θ' and the normal gripping angle θr of the reference posture illustrated in FIG. 6A. For example, the cooking tool 620 of FIG. 6B may be inclined downward by an angle θr-θ' in comparison to the reference posture. Accordingly, the processor 270 may rotate the end-effector 610 in an opposite direction by the angle θr-θ'. Such correction allows an actual position of the cooking tool 620 to be the same as a position of the cooking tool 620 in the reference posture. A subsequent cooking operation may be performed using the above-described position-corrected cooking tool, thereby improving the accuracy of the operation.

Figure 7:
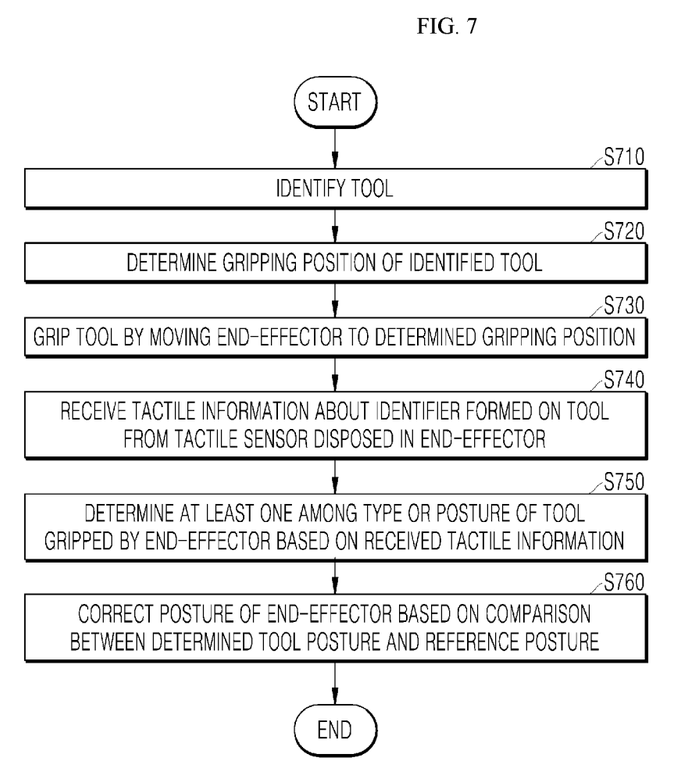
FIG. 7 is a flowchart illustrating a method for operating a robot according to an embodiment of the present disclosure.

FIG. 7 is a flowchart illustrating a method for operating a robot according to an embodiment of the present disclosure. The method illustrated in FIG. 7 may be performed by the robot 200 of FIG. 2, more specifically, the processor 270 of the robot 200.

In step S710, the robot 200 may identify a tool. In an embodiment, the robot 200 may identify a tool to be gripped based on sensor data obtained from the image sensor.

In step S720, the robot 200 may determine a gripping position of the identified tool.

In step S730, the robot 200 may grip the tool by moving an end-effector to the determined gripping position.

As described above, initial reference positions of tools in a space may be predefined, and positions of the tools may be continuously tracked throughout the operation. In this case, steps S710 to S730 may not be performed. Instead, the robot 200 may grip the tool by moving the end-effector to position coordinates of a grip of the tool to be gripped. In this case, the sensor data obtained from the image sensor may be selectively used to assist in the identification and gripping of the tool.

In step S740, the robot 200 may receive tactile information about an identifier formed on the tool from a tactile sensor disposed in the end-effector. The tactile information may include a three-dimensional tactile image representing a spatial distribution of pressure or force measured by the tactile sensor. The identifier may include imprinted information in which a pattern is characterizable by tactile sensation. The imprinted information may include braille, type, imprint, marker, or barcode of which at least a portion is protruding or recessed.

In step S750, the robot 200 may determine at least one of a type or a posture of the tool gripped by the end-effector based on the received tactile information. In an embodiment, the robot 200 may determine the type or the posture of the tool by converting the three-dimensional tactile image into a two-dimensional tactile image, and comparing the converted two-dimensional tactile image with template tactile images of identifiers. The robot 200 may determine the type of the tool based on a template tactile image that matches the two-dimensional tactile image. In addition, the robot 200 may determine a gripped posture of the tool based on a comparison between coordinates of feature points of the two-dimensional tactile image and the matching template tactile image.

In step S760, the robot 200 may correct a posture of the end-effector based on a comparison between the determined tool posture and a reference posture. In an embodiment, the robot 200 may rotate the end-effector in an opposite direction by a difference between a gripping angle of the tool and a normal gripping angle of the reference posture.

Referring back to FIG. 2, in an embodiment, the robot 200 may further include a learning processor 260 to perform operations related to AI and/or machine learning.

AI refers to a field of studying AI or a methodology for creating the same. Moreover, machine learning may refer to a field of defining various problems dealing in an AI field and studying methodologies for solving the same. In addition, machine learning may be defined as an algorithm for improving performance with respect to a task through repeated experience with respect to the task.

An ANN is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

The machine learning may be classified into supervised learning, unsupervised learning, and reinforcement learning depending on the learning method.

Supervised learning may refer to a method for training the ANN with training data that has been given a label. In addition, the label may refer to a target answer (or a result value) to be inferred by the ANN when the training data is inputted to the ANN. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning may be one machine learning technique. Hereinafter, the meaning of machine learning may include deep learning.

The learning processor 260 may allow a model, composed of an ANN to be trained using training data. Here, the trained ANN may be referred to as a trained model. The trained model may be used to infer a result value with respect to new input data rather than training data, and the inferred value may be used as a basis for a determination to perform an operation.

The learning processor 260 may train the ANN by using tactile information or image information about identifiers of cooking tools as training data.

In an embodiment, the learning processor 260 may train the ANN, by using various patterns of the tactile information about the identifiers of the cooking tools and template tactile images of the identifiers as training data, so as to output a type and posture of a corresponding cooking tool.

In an embodiment, the learning processor 260 may determine the type or posture of the corresponding cooking tool by using the tactile information about the identifiers of the cooking tools as input data for a learning model based on the ANN. The posture of the tool determined based on the ANN may be used to correct the posture of the tool determined by the method of FIG. 7.

Figure 8:
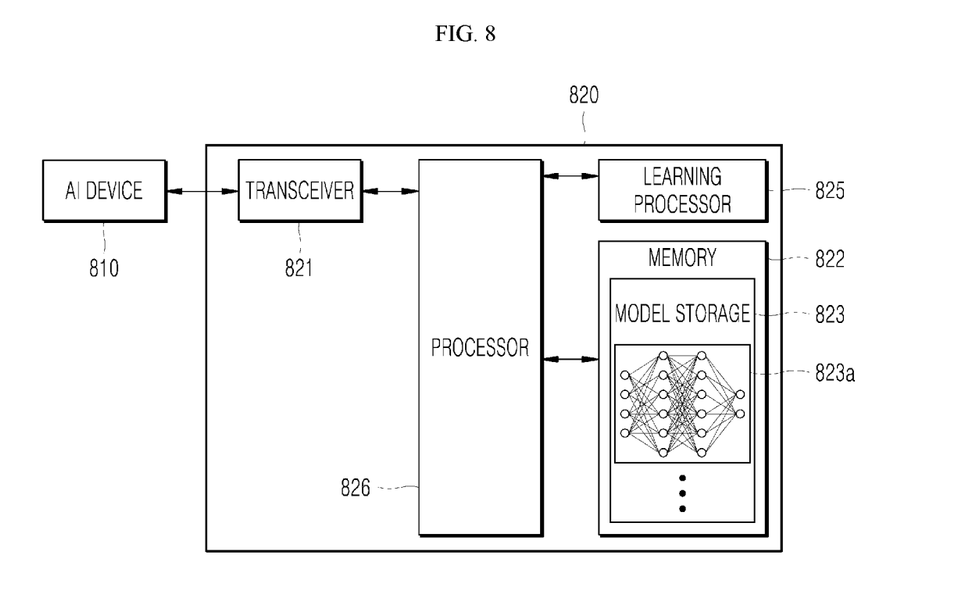
FIG. 8 is a diagram illustrating a robot system according to another embodiment of the present disclosure.

The learning processor 260 may perform AI and/or machine learning processing together with a learning processor 825 of an AI server 820 of FIG. 8. The learning processor 260 may include a memory integrated with or implemented in the robot 200. Alternatively, the learning processor 260 may also be implemented by using a storage 280, an external memory directly coupled to the robot 200, or a memory held in an external device.

FIG. 8 is a diagram illustrating a robot system according to another embodiment of the present disclosure. In an embodiment, a robot system may be implemented as an AI system capable of performing AI and/or machine learning. Referring to FIG. 8, a robot system according to another embodiment of the present disclosure may include an AI device 810 and an AI server 820.

In an embodiment, the AI device 810 may be the robot 110, the server 120, the terminal 130 of FIG. 1, or the robot 200 of FIG. 2. The AI server 820 may be the server 120 of FIG. 1.

The AI server 820 may refer to a device that uses a trained ANN or a device that trains an ANN by using a machine learning algorithm. The AI server 820 may be composed of a plurality of servers to perform distributed processing. The AI server 820 may be included as a partial configuration of the AI device 810, and may perform at least partial AI or machine learning processing.

The AI server 820 may include a transceiver 821, a memory 822, a learning processor 825, and a processor 826.

The transceiver 821 may transmit and receive data with an external device such as the AI device 810.

The memory 822 may include a model storage 823. The model storage 823 may store a model (or an ANN 823a) that is being trained or has been trained via the learning processor 825.

The learning processor 825 may train the ANN 823a by using training data. The learning model may be used while mounted in the AI server 820 of the ANN, or may be used while mounted in an external device such as the AI device 810.

The learning model may be implemented as hardware, software, or a combination of hardware and software. When a portion or the entirety of the learning model is implemented as software, one or more instructions, which constitute the learning model, may be stored in the memory 822.

The processor 826 may infer a result value with respect to new input data using the learning model, and generate a response or control command based on the inferred result value.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is not limited to the example embodiments described above, and rather intended to include the following appended claims, and all modifications, equivalents, and alternatives falling within the spirit and scope of the following claims.

What is claimed is:

1. A robot comprising:
   an end-effector configured to grip a tool;
   a tactile sensor disposed in the end-effector, the tactile sensor configured to generate tactile information about an identifier formed on the tool,
   wherein at least a portion of the identifier is protruding or recessed, and
   wherein the tactile information includes three-dimensional information representing a spatial distribution of pressure or force measured by the tactile sensor; and
   a processor configured to cause the end-effector to grip the tool, and determine at least one of a type or a posture of the tool gripped by the end-effector based on the tactile information received from the tactile sensor.

2. The robot according to claim 1, wherein the tactile information comprises a three-dimensional tactile image.

3. The robot according to claim 2, wherein the processor is further configured to:
   convert the three-dimensional tactile image into a two-dimensional tactile image including a plurality of pixels or a group of pixels representing an information corresponding to the spatial distribution of the pressure or the force, and
   determine the type or the posture of the tool based on a comparison between the converted two-dimensional tactile image and template tactile images of identifiers.

4. The robot according to claim 3, wherein the converted two-dimensional tactile image comprises the plurality of pixels the group of pixels representing a value or a color corresponding to a spatial height of the three-dimensional tactile image.

5. The robot according to claim 3, wherein the processor is further configured to determine the type of the tool based on a template tactile image that matches the two-dimensional tactile image and determine a gripped posture of the tool based on a comparison between coordinates of feature points of the two-dimensional tactile image and the matching template tactile image.

6. The robot according to claim 5, wherein the processor is further configured to correct a posture of the end-effector based on a comparison between the gripped posture of the tool and a reference posture.

7. The robot according to claim 6, wherein the processor is further configured to rotate the end-effector to compensate for a difference between a normal gripping angle of the reference posture and a gripping angle of the tool.

8. The robot according to claim 1, wherein the identifier comprises imprinted information in which a pattern is characterized by tactile sensation, and
   wherein the imprinted information is sensed, by the tactile sensor, from at least one of a braille, a type, an imprint, a marker, or a barcode of which at least a portion is protruding or recessed.

9. The robot according to claim 1, further comprising a memory configured to store position information of the tool,
   wherein the processor is further configured to cause the end-effector to grip the tool based on the position information of the tool.

10. The robot according to claim 1, further comprising an image sensor,
    wherein the processor is further configured to identify the tool based on sensor data obtained from the image sensor, determine a gripping position of the identified tool, and cause the end-effector to grip the tool based on the determined gripping position.

11. The robot according to claim 1, wherein the processor is further configured to determine a position in which the identifier is formed as a gripping position of the end-effector.

12. A method for controlling a robot, the method comprising:
    gripping a tool with an end-effector;
    receiving tactile information about an identifier formed on the tool from a tactile sensor disposed in the end-effector,
    wherein at least a portion of the identifier is protruding or recessed, and
    wherein the tactile information includes three-dimensional information representing a spatial distribution of pressure or force measured by the tactile sensor; and
    determining at least one of a type or a posture of the tool gripped by the end-effector based on the received tactile information.

13. The method according to claim 12, wherein the tactile information comprises a three-dimensional tactile image.

14. The method according to claim 13, wherein the determining the at least one of the type or the posture of the tool gripped by the end-effector comprises:
    converting the three-dimensional tactile image into a two-dimensional tactile image including a plurality of pixels or a group of pixels representing an information corresponding to the spatial distribution of the pressure or the force;
    comparing the converted two-dimensional tactile image with template tactile images of identifiers; and
    determining the type or the posture of the tool based on the comparison.

15. The method according to claim 14, wherein the determining the type or the posture of the tool comprises determining the type of the tool based on a template tactile image that matches the two-dimensional tactile image.

16. The method according to claim 14, wherein the determining the type or the posture of the tool further comprises determining a gripped posture of the tool based on a comparison between coordinates of feature points of the two-dimensional tactile image and the matching template tactile image.

17. The method according to claim 16, further comprising correcting a posture of the end-effector based on a comparison between the gripped posture of the tool and a reference posture.

18. The method according to claim 17, wherein the correcting the posture of the end-effector comprises rotating the end-effector to compensate for a difference between a normal gripping angle of the reference posture and a gripping angle of the tool.

19. The method according to claim 12, wherein the gripping the tool with the end-effector comprises:
- identifying the tool based on sensor data obtained from an image sensor;
- determining a gripping position of the identified tool; and
- gripping the tool by moving the end-effector to the determined gripping position.

20. The method according to claim 12, further comprising determining a position in which the identifier is formed as a gripping position of the end-effector.

* * * * *